(12) United States Patent
Silvis et al.

(10) Patent No.: US 7,055,364 B2
(45) Date of Patent: Jun. 6, 2006

(54) EXHAUST VOLUME MEASUREMENT DEVICE

(75) Inventors: William Martin Silvis, Ann Arbor, MI (US); Norbert Kreft, Ann Arbor, MI (US); Gerald Marek, Ann Arbor, MI (US); James Williamson, Whitmore Lake, MI (US)

(73) Assignee: AVL North America, Inc., Plymouth, MI (US)

( * ) Notice: Subject to any disclaimer, the term of this patent is extended or adjusted under 35 U.S.C. 154(b) by 0 days.

(21) Appl. No.: 10/981,235

(22) Filed: Nov. 4, 2004

(65) Prior Publication Data

US 2005/0086994 A1    Apr. 28, 2005

Related U.S. Application Data

(62) Division of application No. 10/310,524, filed on Dec. 5, 2002, now Pat. No. 6,973,818.

(51) Int. Cl.
*G01N 21/00* (2006.01)

(52) U.S. Cl. .................... 73/1.06; 73/1.16; 73/1.02; 73/1.25

(58) Field of Classification Search ............... 73/1.06, 73/1.02, 1.16, 1.25, 1.15, 1.26, 1.35
See application file for complete search history.

(56) References Cited

U.S. PATENT DOCUMENTS

| | | |
|---|---|---|
| 2,406,656 A | 8/1946 | Birmann |
| 3,699,814 A | 10/1972 | Kaufman |
| 3,817,100 A | 6/1974 | Anderson |
| 4,264,961 A | 4/1981 | Nishimura et al. |
| 4,341,107 A | 7/1982 | Blair |
| 4,361,028 A | 11/1982 | Kamiya et al. |
| 4,586,367 A | 5/1986 | Lewis |
| 4,823,591 A | 4/1989 | Lewis |
| 5,090,258 A | 2/1992 | Yamasaki et al. |

(Continued)

OTHER PUBLICATIONS

40 C.F.R. Section 86 (excerpts); "CVS Calibration", 1983, Environmental Protection Agency.

(Continued)

*Primary Examiner*—Hezron Williams
*Assistant Examiner*—Rodney Frank
(74) *Attorney, Agent, or Firm*—Carlson, Gaskey & Olds

(57) ABSTRACT

A vehicle exhaust measurement system is provided includes that a conduit having a conduit inlet and a conduit outlet. A make-up air tube is connected to and is in fluid communication with the conduit inlet. The make-up air tube provides make-up air for mixing an exhaust gas. A mixed gas tube is connected to and is in fluid communication with the conduit outlet. The mixed gas tube conveys a mixture of make-up air and exhaust gas to analysis equipment. In the preferred embodiment, the exhaust gas tube extends through an outer wall of the conduit. A mixing plate is arranged in either the conduit or the mixed gas tube with the exhaust gas tube extending to a position adjacent to the mixing plate. The exhaust gas tube conveys the exhaust gas to the mixing plate to mix the exhaust gas and the make-up air at the mixing plate. A correction factor may be applied to the measurements taken by a differential pressure based fluid flow measurement device such as a smooth approach orifice (SAO) to provide an adjusted flow of measurement at the flow measurement device to correct for the pressure pulsations. The correction factor is calculated based upon the intensity of the pulsations of the differential pressure signal, which indicates the flow through the SAO.

18 Claims, 4 Drawing Sheets

U.S. PATENT DOCUMENTS

| | | | |
|---|---|---|---|
| 5,184,501 | A | 2/1993 | Lewis et al. |
| 5,337,595 | A | 8/1994 | Lewis |
| 5,627,328 | A | 5/1997 | Sheridan et al. |
| 5,648,601 | A | 7/1997 | Katoh et al. |
| 6,370,936 | B1 | 4/2002 | Yamagishi et al. |
| 6,405,122 | B1 * | 6/2002 | Yamaguchi ............... 701/106 |
| 6,546,812 | B1 | 4/2003 | Lewis |

OTHER PUBLICATIONS

Horiba Manual, 1978, Horiba Instruments.

Draft EPA Memo, Environmental Protection Agency.

Coltec Engineering, "Sonic Nozzles", www.colteceng.com/sonic.htm.

Calibration Services by Graftel, "Sonic Nozzle Calibration", www.calibrationlabs.com/sonic_nozzles_and_sonic_chokes.htm.

MD. Bassett, R.J. Pearson, D.E. Winterbone and R. Sierens, Steady-Flow Loss-Coefficient Estimation For Exhaust Manifold Pulse-Converter Type Junctions, Mar. 1-4, 1999, Detroit, MI.

M.D. Bassett, D.E. Winterbone and R.J. Pearson, "Modeling Engines With Pulse Converted Exhaust Manifolds Using One-Dimensional Techniques", Mar. 6-9, 200, Detroit, MI.

Horiba internet document entitled Engine Measurement Division—Dilution Systems last updated May 1, 2003.

* cited by examiner

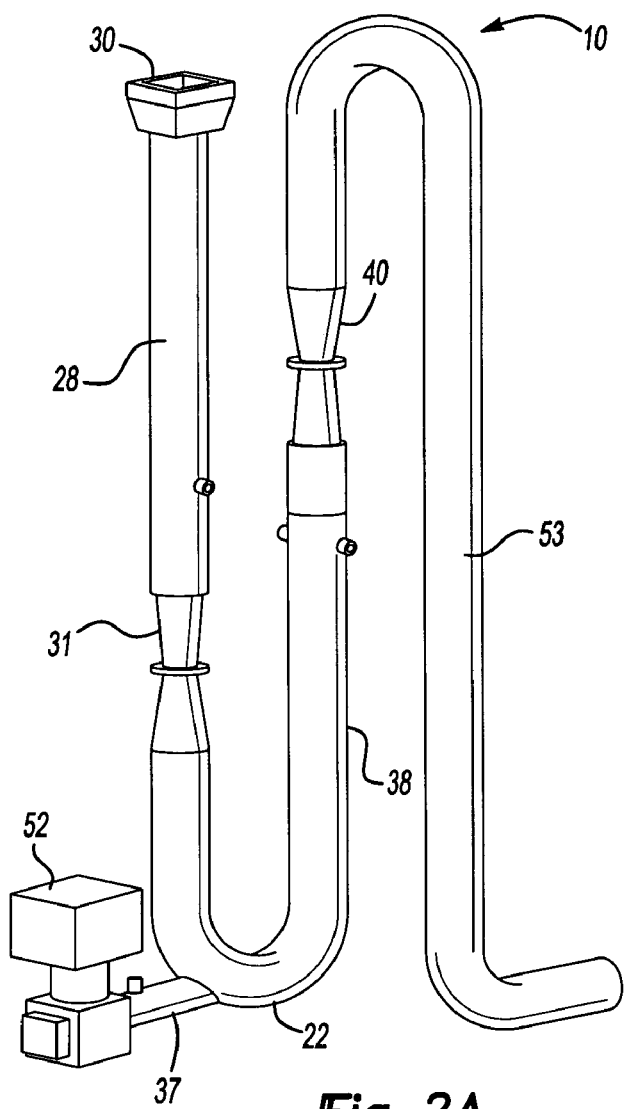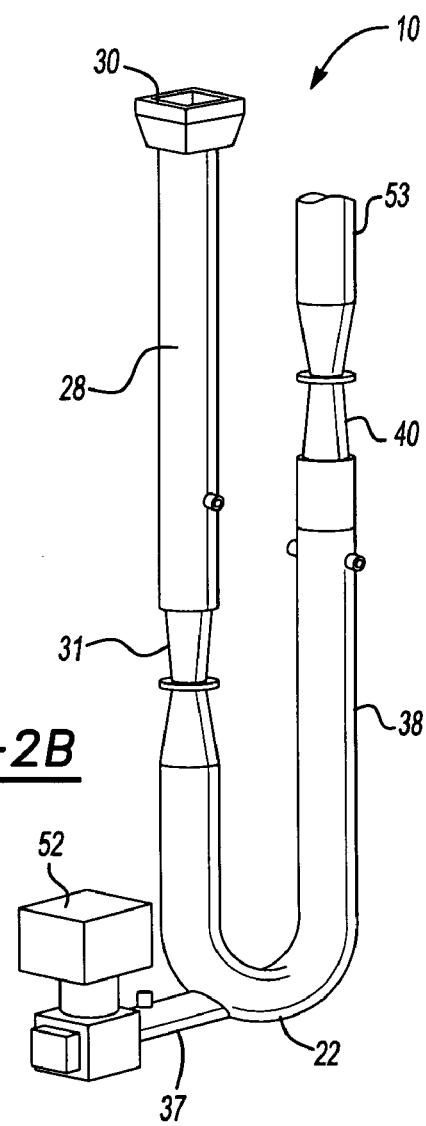
*Fig-2A*
*Fig-2B*

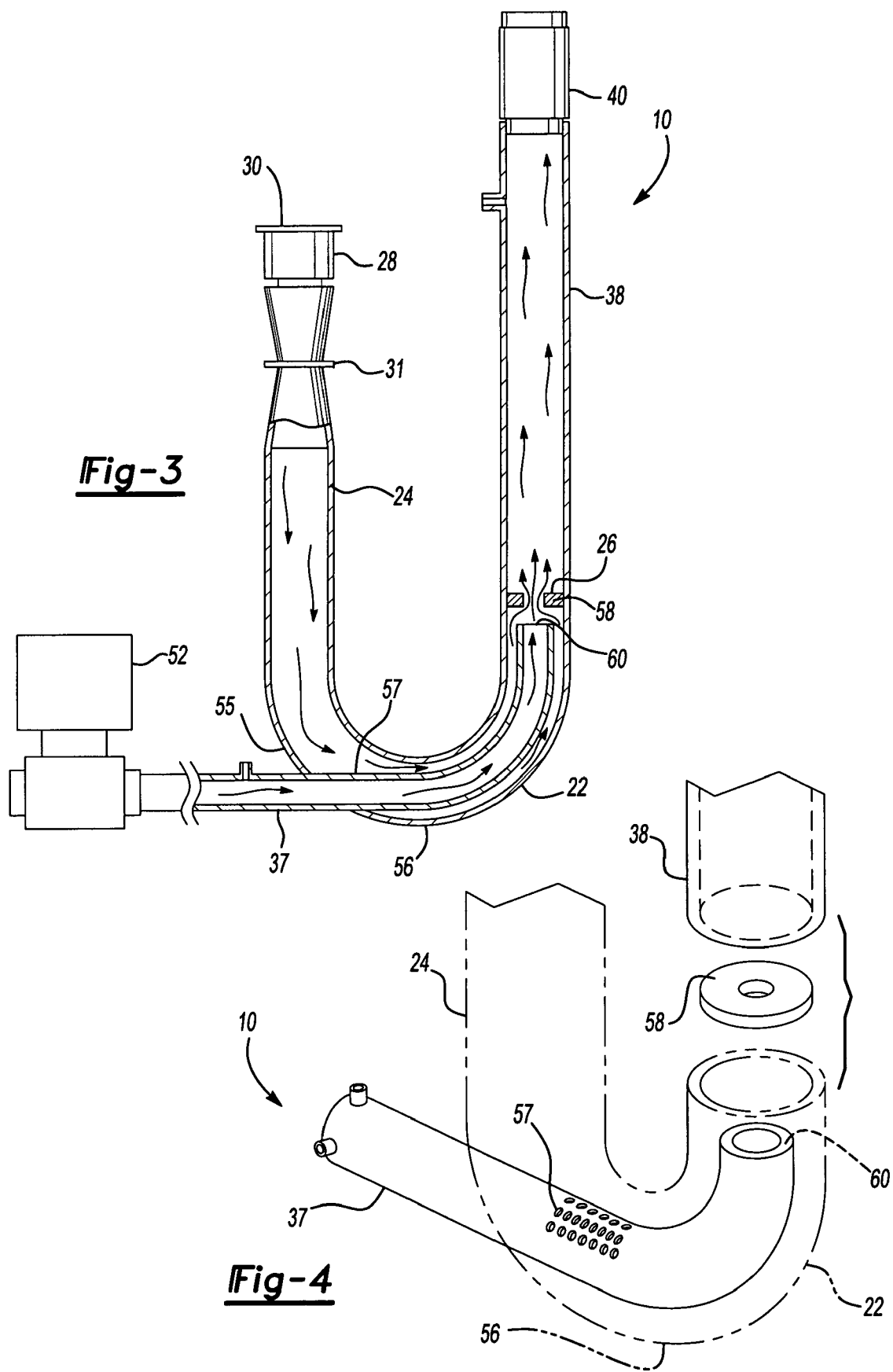

EXHAUST VOLUME MEASUREMENT DEVICE

This application is a Divisional of U.S. patent application Ser. No. 10/310,524, filed on Dec. 5, 2002.

BACKGROUND OF THE INVENTION

This invention relates to an engine or vehicle exhaust measurement device, and more particularly, the invention relates to a compact direct vehicle exhaust flow measurement device (DVE), which may be easily packaged within a test cell while providing compensation for engine exhaust pulsations when needed.

The determination of engine or vehicle exhaust emissions during a test cycle is necessary to verify compliance with emission standards. To quantify the products of combustion correctly either the exhaust flow has to be known or an alternative method has to be used. A common method is the CVS (Constant Volume Sampling) principle, which has been used for many years in the industry and is a widely used standard. A CVS system samples the total amount of exhaust gas expelled by the engine or vehicle and dilutes it with air. The total flow as a sum of exhaust gas and dilution air is kept virtually constant. A constant sample is taken at a point far enough downstream of the mixing zone where the mixture is homogenous. CVS systems are quite large and costly, especially when they are designed for large flow rates.

The raw modal and partial flow sampling methods have proven to be adequate, but especially for transient test cycles they require a fast and accurate exhaust flow measurement system to control the proportionality of gaseous and particulate sampling. International standards like ISO 8178 or ISO 16183 specify exhaust gas flow measurement methods and accuracy requirements. The preferred type of system that may be employed to gather and test the exhaust is a direct vehicle exhaust flow measurement device (DVE). A DVE receives the entire volume of exhaust gases and measures the exhaust flow directly at the tailpipe. A wide variety of measurement principles has been applied, i.e. ultrasonic flow meters or differential pressure devices, like flow nozzles. An additional requirement for vehicle testing is a low pressure change at the exit of the tailpipe, which can only be achieved with a low flow restriction of the flow metering device.

Internal combustion engines utilize poppet valves to release the spent exhaust gases from the combustion cylinder to the tailpipe. As the exhaust valves open and close pressure pulsations are created within the exhaust gas stream. Emissions standards have become more stringent, and therefore, measurement accuracy has become increasingly important. The pressure pulsations within the exhaust gases may introduce an error into the flow measurement and may result in an inaccuracy in the emissions test. Precautions have to be taken or an active correction has to be employed to minimize the impact of these pressure pulsations on the flow measurement.

One embodiment of a DVE based on differential pressure devices is described in the prior art. This embodiment mixes the total amount of exhaust with make-up air and measures the mixed exhaust flow rate as well as the flow of make-up gas such as ambient air. The exhaust flow is calculated by subtracting the make-up air flow into the system measured by a subsonic venturi from the total flow of make-up air and exhaust gases through the system measured by a critical flow venturi. A correction factor might be generated by comparing the flow of make-up air through the subsonic venturi and the critical flow venturi during a calibration process in which the tailpipe is closed. However, an inaccuracy results with such a calibration procedure because of the nonlinear relationship between the differential pressure across the subsonic venturi and the flow rate through this device. Other inaccuracies are introduced by the presence of engine pulsations. Further, inaccuracies are caused in the temperature measurement from inhomogeneous mixing of make-up air and hot exhaust gases.

Typically, the emissions test takes place in a rather confined cell in which space is limited. As a result, the exhaust gas flow measurement system must be rather compact but without compromising the high level of accuracy needed to comply with the increasingly stringent emissions test standards. Therefore, what is needed is an exhaust flow measurement device with low flow restriction that may be packaged within a cell while providing an accurate flow measurement with reduced sensitivity to exhaust gas pressure pulsations.

SUMMARY OF THE INVENTION AND ADVANTAGES

The present invention provides a vehicle exhaust measurement system that receives the entire volume of exhaust gases and mixes it with a make-up gas such as ambient air. The system includes a conduit having a conduit inlet and a conduit outlet. A make-up air tube and a flow meter are connected to and are in fluid communication with the conduit inlet. The make-up air tube provides make-up air for mixing with the exhaust gas from the vehicle or engine. In the preferred embodiment the make-up air flow meter measures a pressure differential across a head type flow meter indicative of make-up airflow. A mixed gas tube is connected to and is in fluid communication with the conduit outlet. The mixed gas tube conveys a mixture of make-up air and exhaust gas to a critical flow venturi. A blower is connected to the outlet of the critical flow venturi and provides sufficient suction to maintain critical flow throughout its operation. The exhaust gas tube, which conveys the total exhaust gas of the engine or vehicle to the U-shaped conduit, extends through an outer wall of the conduit. A mixing plate is arranged in either of the conduit or the mixed gas tube. The exhaust gas tube extends to a position near the mixing plate. The exhaust gas tube conveys the exhaust gas to the mixing plate, where the make-up air and exhaust gas are homogeneously mixed. A section of the exhaust gas tube that is inside the conduit may be perforated to reduce the suction on the exhaust gas tube.

The flow of make-up air and exhaust through the system is determined minus the flow of make-up air into the system to determine the flow of the total volume of exhaust gases. The flow through the DVE is calibrated by comparing the flow rates at a smooth approach orifice and critical flow venturi. A calibration factor is determined based upon the comparison and is applied to a differential pressure transducer associated with the smooth approach orifice to obtain accurate measurements at the smooth approach orifice throughout the range of flow rates there through.

The intensity and frequency of the exhaust gas pulsations is determined and a correction factor is calculated based upon the intensity of the exhaust gas pulsations. This correction factor may be applied to the measurements taken by the make-up air flow meter to provide an adjusted flow of measurement at the flow measurement device to correct for the pressure pulsations.

Accordingly, the above invention provides an exhaust volume measurement device that may be packaged within a cell while maintaining a homogeneous mixture and provides an accurate measurement of the flow.

BRIEF DESCRIPTION OF THE DRAWINGS

Other advantages of the present invention can be understood by reference to the following detailed description when considered in connection with the accompanying drawings wherein:

FIG. 2A is a perspective view of one tubing arrangement for a test cell having exhaust gas collection tubing at the floor;

FIG. 2B is a perspective view of the vehicle exhaust measurement system for a test cell having exhaust gas collection tubing at the ceiling;

FIG. 3 is a cross-sectional view of a flow measurement system incorporating a mixing plate;

FIG. 4 is a perspective view of the conduit shown in FIG. 3;

DETAILED DESCRIPTION OF THE PREFERRED EMBODIMENT

Figure 1:
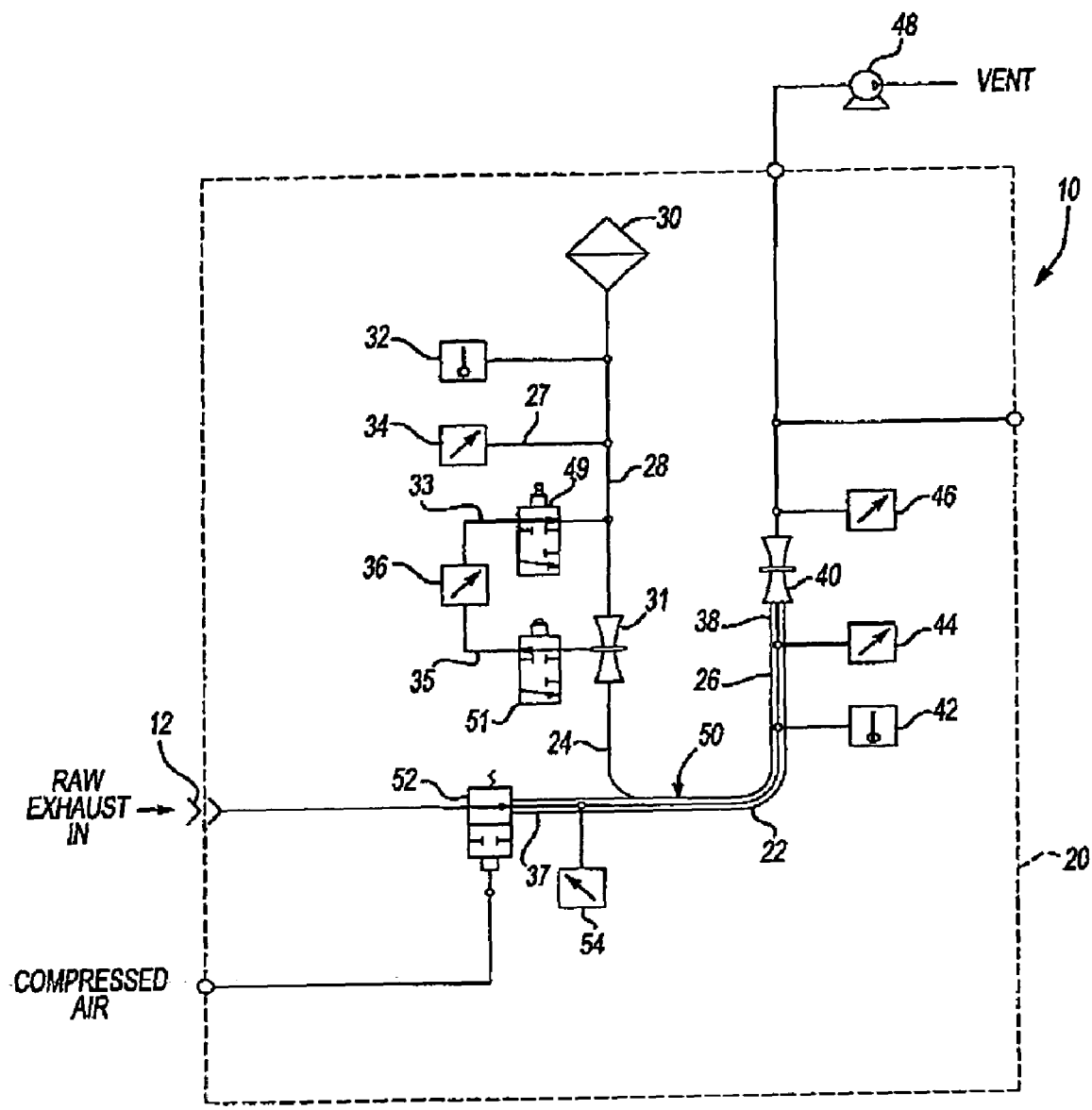
FIG. 1 is a schematic view of the present invention vehicle exhaust measurement system.

The exhaust flow measurement system 10 is shown schematically in FIG. 1. The system 10 is attached to a tailpipe 12 from an engine or vehicle that contains exhaust gases having the products of combustion. Since the flow measurement system 10 must typically be packaged within the spatial constraints of an emissions test cell, the tubing in the system must be arranged in such a manner to fit within the test cell. Similarly, it is desirable to have the flow measurement devices and sensors packaged compactly relative to one another so that they and the associated controllers may be packaged as a unit within the test cell along with the tubing.

The exhaust gases from the tailpipe 12 are mixed with a make-up gas such as ambient air. The flow of the exhaust ($Q_{exhaust}$) is determined by taking the total flow of the exhaust gases mixed with make-up air ($Q_{tot}$) and subtracting the flow of the make-up air ($Q_{air}$). The calculation without correction is represented by equation 1 below.

$$Q_{exhaust} = Q_{tot} - Q_{air} \quad \text{(equation 1)}$$

Referring to FIGS. 1 and 3, the flow measurement system 10 includes a conduit 22 having a conduit inlet 24 and a conduit outlet 26. Preferably, the conduit is U-shaped, which enables the system to be packages more compactly. A make-up air tube 28 is connected to the conduit inlet 24. The make-up air flows through a flow meter such as a smooth approach orifice (SAO) 31 to measure the flow of make-up air to determine $Q_{air}$. It is to be understood that various types of flow meters, such as other head type flow meters or ultrasonic flow meters, may be used to measure the flow of the make-up gas. Returning now to FIG. 1, a temperature sensor 32 and an absolute pressure sensor 34 are arranged at the inlet of the SAO 31. A pressure sensor 36 measures the differential pressure between the throat of the SAO 31 and the inlet. The sensors 32, 34, 36 are used to calculate the flow through the SAO 31, as it is well known in the art.

Prior art configurations may share pressure sensor connections and use unbalanced conduits, which introduces errors into the pressure pulsation intensity measurement on either side of the sensor. The error introduced in the prior art may be up to several percent of the measured flow. In the present invention the pressure sensor 34 is preferably connected to the tube 28 by conduit 27 independently from pressure sensor 36. Furthermore, the conduits 33 and 35, which connect pressure sensor 36, are acoustically balanced. Providing separate connections for the sensors 34 and 36 and using acoustically balanced conduits ensures more accurate pressure pulsation intensity measurements. For best results, each of the differential pressure sensors must be acoustically balanced for the DVE at the initial setup of the system to account for the variations between the sensors.

The procedure of acoustical balancing of the pressure transducers contains the following steps: The conduits 33 and 35, which connect the differential pressure sensor 36 at one end, have to be connected at the other end to one point and pressure pulsations have to be introduced there. The length of either the conduit 33 or 35 has to be varied until the pressure sensor 36 is not able detect the pressure pulsations. Specifically, a tee is connected to the DVE where it will be subject to pressure pulsations. The pressure sensor is connected to either side of the tee with substantially equal lengths of conduits in an effort to obtain the same transport time and magnitude of the pressure pulsations on either side of the sensor. The lengths are adjusted to account for the variation in the sensor and the conduits, which typically results in conduits of substantially the same length assuming conduits of the same internal diameter. The sensor may then be reattached to the DVE in the normal manner for testing with the length-adjusted conduits. The acoustic balancing procedure must be repeated if the sensor is replaced.

While the acoustic balancing is discussed in terms of adjusting length of the conduits, it is to be understood that any factor may be adjusted that contributes to the imbalance of pressure pulsations on either side of the sensor. In a broader sense, the volume of the conduits is adjusted to balance the sensor. In the case small diameter tubing, such as 1/16" inner diameter, the sensor may be easily balanced by trimming the length of the tubing.

An exhaust gas tube 37 conveys the exhaust gases from the tailpipe 12 to the conduit 22.

A mixed gas tube 38 is connected to the conduit outlet 26. The exhaust gas and make-up air are mixed in the mixed gas tube 38. A critical flow venturi (CFV) 40 regulates and measures the flow of the mixture of exhaust gas and make-up air. It is to be understood that various types of flow meters, such as other head type flow meters, may be used to measure the flow of the mixture of exhaust gas and make-up air. A fast response temperature sensor 42 and an absolute pressure sensor 44 are arranged at the inlet of the CFV. To obtain the desired flow meter accuracy, the reading of the temperature sensor is preferably within about ±6° C. (±12° F.) after about 0.3 s, while the repeatability of the sensor is preferably better than about ±0.3° C. (±0.6° F.). The fast response time of the temperature sensor is required for transient operation of the DVE. An absolute pressure sensor 46 may be arranged at the outlet of the CFV 40 to verify that the flow remains critical during the test.

The sensors 42 and 44 are used to calculate the flow of diluted exhaust gas through the CFV 40, as is well known in the art. The exhaust and make-up gases are preferably homogeneously mixed prior to entering the CFV and temperature measurement of the gases to ensure accurate results. Use of a mixing plate enables the gases to be mixed over a shorter length of tube so that a more compact system may be used. This, in turn, also enables the flow meters and sensors to be located more closely to one another. The measurement taken at the SAO 31 is subtracted from the measurement taken at the CFV 40 to determine the flow of exhaust gases entering the flow measurement system 10 from the exhaust gas tube 37, as indicated by equation 1 above.

A blower 48 maintains critical flow through the CFV 40 to ensure that the measurement at the CFV is accurate. A heated blanket 50 may be wrapped about the exposed portion of the exhaust gas tube 30 and the conduit 22 up to the CFV 40 to ensure that the gases within the flow measurement system 10 do not condense prior to reaching the CFV 40. Condensation of the gases would introduce an error into the measurement taken by the CFV 40.

FIGS. 2A and 2B depict tubing 53 that may carry the mixed exhaust gases to the blower. If the tubing is arranged at the floor of the test cell a tubing arrangement, as shown by reference number 53 in FIG. 2A, may be used. If the tubing is at the ceiling of the test cell the tube 53, as shown in FIG. 2B, may be used.

Referring to FIGS. 3 and 4, the conduit 22 includes an outer radius 55. Conduit 22 includes an apex 56, which may be defined by the midpoint of the curvature of the outer radius. The exhaust gas tube 37 extends through the outer wall of the conduit 22 to one side of the apex 56 and is curved in a manner similar to the curvature of the conduit 22. A mixing plate 58 is disposed within the conduit 22 or the mixed gas tube 38. Preferably, the mixing plate 58 is arranged after the curvature of the conduit 22. The exhaust gas tube 37 includes a terminal end 60 that is arranged proximate to the mixing plate 58. A section 57 of the exhaust gas tube 37 may be perforated once the tube 37 enters the conduit 22 to reduce the suction on the tailpipe. Mixing of the exhaust gas from the exhaust gas tube 37 and the make-up air from the conduit 22 substantially begins at the mixing plate 58. Preferably, the length of the mixed gas tube 38 is sufficient to permit homogeneous mixing of the gases prior to measurement of the diluted gases at the CFV 40. Homogeneous mixing is required to ensure proper operation of the CFV and accurate temperature measurement.

The flow measurement system 10 must be calibrated to ensure accurate flow measurement through the flow devices. This calibration procedure is performed in two steps. At first the three-way valves 49 and 51 are switched to disconnect the conduits 33 and 35 of the pressure transducer 36 from the SAO 31. The ends of the conduits are now open to atmosphere. After an appropriate stabilization time a new zero offset B is calculated for the differential pressure transducer 36. After completing the first step the conduits 33 and 35 are reconnected to the SAO 31, the valve 52 is closed and the blower 48 draws ambient air through the SAO 31 and CFV 40. The flow measurements taken at the SAO 31 and CFV 40 should be in agreement with one another. A correction factor A is calculated using equation 2 below. The correction factor A is coincident with the ratio of the flow through the SAO 31 and the flow through the CFV 40 and has to be applied to the reading of the differential pressure sensor 36.

$$Q_{CFV} = C_D \cdot Y \cdot \frac{\pi}{4} \cdot d^2 \cdot \sqrt{\frac{2 \cdot A \cdot (\Delta p + B)}{\rho \cdot (1 - \beta^4)}} \quad \text{(equation 2)}$$

$C_D$ discharge coefficient
$d$ throat diameter
$\rho$ gas density
$\beta = d_{THROAT} / D_{INLET}$ Y is the adiabatic expansion factor:

$$Y = \sqrt{\tau^{\frac{2}{\kappa}} \cdot \frac{\kappa}{\kappa - 1} \cdot \frac{1 - \tau^{\frac{\kappa-1}{\kappa}}}{1 - \tau} \cdot \frac{1 - \beta^4}{1 - \beta^4 \cdot \tau^{\frac{2}{\kappa}}}} \quad \text{(equation 3)}$$

$\tau = p_{THROAT} / p_{INLET}$
$\kappa = C_p / C_v$
$C_p, C_v$ are the specific heat capacities This calibration method differs from the calibration described in the prior art, where a correction factor is simply multiplied with the flow rate through the subsonic venturi. However, inaccuracy results with such a calibration procedure because of the nonlinear relationship between the differential pressure across the subsonic venturi and the flow rate through this device, the calibration method is only accurate for one specific flow rate. In contrast, the present invention calibration method ensures the accuracy of the calibrated SAO readings over the complete flow range of the device.

Figure 5:
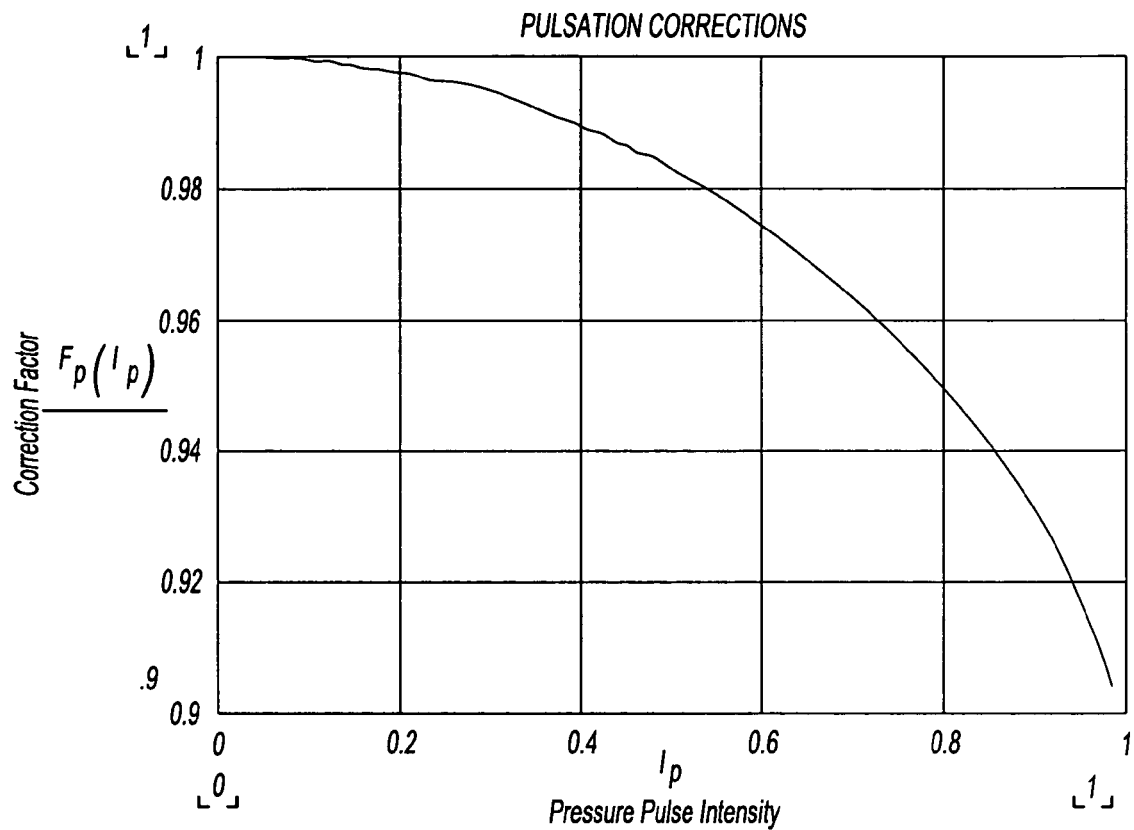
FIG. 5 is a graph of corrections factors for pressure pulsations.
Figure 6:
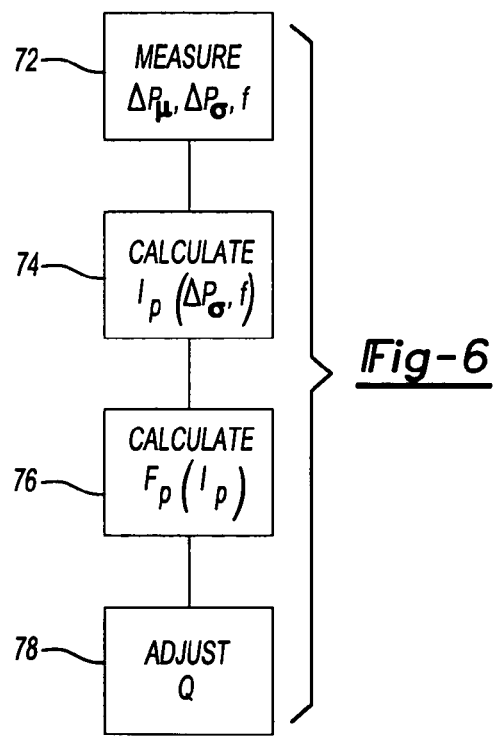
FIG. 6 is a flow diagram depicting a method of correcting the pressure measurements for exhaust gas pressure pulsations.

The effects of the undesired exhaust gas pressure pulsations may be minimized by applying a correction factor to the flow measurement. With reference to FIGS. 5 and 6, this correction factor is calculated from the differential pressure measurement of the pressure transducer 36 and depends on the pulsation intensity of the pressure signal. The frequency f of the pulsations varies depending on engine parameters and operation and is measured with a signal processing circuit (see block 72). The signal processing circuit processes the pressure signal to generate a filtered signal $\Delta P_\mu$ (see block 72) at a cutoff frequency of approximately half of the minimum frequency of the pressure pulsations. The magnitude of the pressure pulsations is determined by the signal processing circuit as $\Delta P_\sigma$ (see block 72). The pulsation intensity $I_P$ (see block 74) is calculated as:

$$I_p = \frac{\Delta P_\sigma}{\Delta P_\mu} \cdot \frac{c^*}{\left(c^* + 10.64 \cdot \frac{f}{4} \cdot \Delta x\right)} \text{ with} \quad \text{(equation 4)}$$

$$c^* = c - \frac{Q_{air}}{\pi \frac{d_{th}^2}{4}} \quad \text{(equation 5)}$$

$c$ speed of sound
$\Delta x$ distance between the pressure transducer taps
$Q_{air}$ volumetric make-up air flow
$d_{th}$ SAO throat diameter The constant 10.64 is a unit conversion constant. The combined correction factor is represented by $F_p$ $(I_p)$ (see block 76) and is graphically depicted in FIG. 5.

$$F_p(I_p) = \frac{1}{2 \cdot \pi} \cdot \int_0^{2\pi} \left(\sqrt{I_p \cdot \sin(\theta) + 1}\right) d\theta \quad \text{(equation 6)}$$

The calibrated and corrected exhaust gas flow may be represented by equation 7. The flow measurement correction provides increased accuracy of the tests results.

$$Q_{ex} = Q_{CFV} - F_p (I_p(\Delta P_\mu, \Delta P_\sigma, f)) \cdot Q_{dd} \quad \text{(equation 7)}$$

The correction factor is applied to the flow measurement system 10 as schematically depicted in FIG. 6 (see block 78).

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method of correcting an exhaust flow measurement in a vehicle exhaust measurement system comprising the steps of:
    a) measuring a pressure differential across a head type flow measurement device indicative of a magnitude of exhaust gas flow pressure pulsations;
    b) determining a frequency of the exhaust gas pressure pulsations;
    c) calculating a correction factor based upon the magnitude and the frequency of the exhaust gas pressure pulsations; and
    d) applying the correction factor to measurements taken by the flow measurement device to provide an adjusted flow measurement at the flow measurement device.

2. A method of correcting an exhaust flow measurement in a vehicle exhaust measurement system comprising the steps of:
    a) measuring a pressure differential across a head type flow measurement device indicative of a magnitude of exhaust gas flow pressure pulsations, wherein the flow measurement device is a smooth approach orifice measuring make-up air;
    b) determining a frequency of the exhaust gas pressure pulsations;
    c) calculating a correction factor based upon the magnitude and the frequency of the exhaust gas pressure pulsations; and
    d) applying the correction factor to measurements taken by the flow measurement device to provide an adjusted flow measurement at the flow measurement device.

3. The method according to claim 2, wherein the flow measurement device includes a differential pressure sensor fluidly connected to the smooth approach orifice at a throat location and an inlet location.

4. The method according to claim 3, wherein the correction factor is applied to a flow determined from the smooth approach orifice.

5. The method according to claim 1, wherein the correction factor is a function of pulsation intensity.

6. The method according to claim 5, wherein the pulsation intensity is a function of magnitude and frequency of the exhaust gas pulsations.

7. The method according to claim 5, wherein pulsation intensity $I_p$ is represented by the equation:

$$I_p = \frac{\Delta P_\sigma}{\Delta P_\mu} \cdot \frac{c^*}{\left(c^* + 10.64 \cdot \frac{f}{4} \cdot \Delta x\right)}, \text{ wherein } c^* = c - \frac{Q_{\min}}{\pi \frac{\phi_{in}^2}{4}},$$

c is speed of sound, $\Delta P_\mu$ is filtered frequency signal, $\Delta P_\sigma$ is the magnitude, f is the frequency, $\Delta x$ is distance between pressure transducer taps at flow measurement device, $Q_{air}$ is volumetric make-up air flow, and $d_{th}$ is throat diameter of the flow measurement device.

8. The method according to claim 7, wherein the correction factor $F_p(I_p)$ is represented by the equation:

$$F_p(I_p) = \frac{1}{2 \cdot \pi} \cdot \int_0^{2\pi} \left(\sqrt{I_p \cdot \sin(\theta) + 1}\right) d\theta.$$

9. The method according to claim 7, wherein, $\Delta P_\mu$ is a cutoff frequency at approximately half of a minimum frequency of the exhaust gas pressure pulsations.

10. The method according to claim 5, wherein the pulsation intensity is a function of the ratio of a filtered frequency and the magnitude.

11. The method according to claim 10, wherein the filtered frequency is a cutoff frequency at approximately half of a minimum frequency of the exhaust gas pressure pulsations.

12. A method of correcting an exhaust flow measurement in a vehicle exhaust measurement system comprising the steps of:
    a) providing a first and second venturi;
    b) measuring a pressure differential across one of the venturis, the pressure differential indicative of a magnitude of exhaust gas flow pressure pulsations;
    c) determining a frequency of the exhaust gas pressure pulsations;
    d) calculating a correction factor based upon the magnitude and the frequency of the exhaust gas pressure pulsations; and
    e) applying the correction factor to measurements taken by one of the venturis to provide an adjusted flow measurement.

13. The method according to claim 12, wherein the first and second venturis respectively are subsonic an sonic venturis, step b) performed at the subsonic venturi.

14. The method according to claim 13, wherein the subsonic venturi is a smooth approach orifice.

15. The method according to claim 13, wherein step e) is performed according to the equation:

$$Q_{ex} = Q_{CFV} - F_p(I_p(\Delta P_\mu, \Delta P_\sigma, f)) \cdot Q_{air},$$

wherein $Q_{ex}$ is exhaust flow, $Q_{CFV}$ is flow through the sonic venturi, $F_p$ is the correction factor, $I_p$ is pulsation intensity, $\Delta P_\mu$ is filtered frequency signal, $\Delta P_\sigma$ is the magnitude, f is the frequency, and $Q_{air}$ is make-up air flow through the subsonic venturi.

16. The method according to claim 15, wherein, $\Delta P_\mu$ is a cutoff frequency at approximately half of a minimum frequency of the exhaust gas pressure pulsations.

17. The method according to claim 15, wherein the pulsation intensity is a function of the ratio of a filtered frequency and the magnitude.

18. The method according to claim 17, wherein the filtered frequency is a cutoff frequency at approximately half of a minimum frequency of the exhaust gas pressure pulsations.

* * * * *

UNITED STATES PATENT AND TRADEMARK OFFICE
CERTIFICATE OF CORRECTION

PATENT NO. : 7,055,364 B2
APPLICATION NO. : 10/981235
DATED : June 6, 2006
INVENTOR(S) : William Martin Silvis et al.

It is certified that error appears in the above-identified patent and that said Letters Patent is hereby corrected as shown below:

Column 7, Line 60: please replace the equation after "wherein" with:

$$c^* = c - \frac{Q_{air}}{\pi \cdot \frac{d_{th}^2}{4}}$$

Column 8, Line 45: please replace the equation with the following $$Q_{ex} = Q_{CFV} - F_p\left(I_p\left(\Delta P_\mu, \Delta P_\sigma, f\right)\right) \cdot Q_{dil}$$

Column 8, Line 50: Please replace "$Q_{air}$" with --$Q_{dil}$--

Signed and Sealed this

Seventh Day of November, 2006

JON W. DUDAS
*Director of the United States Patent and Trademark Office*